(12) United States Patent
Archer et al.

(10) Patent No.: US 7,378,170 B2
(45) Date of Patent: May 27, 2008

(54) ELECTRIC MOTIVE POWER SYSTEM FOR A MOTOR VEHICLE, AND METHOD FOR USING A FUEL-CELL

(75) Inventors: Pascal Archer, Paris (FR); Nathalie Cornet, Voisins le Bretonneux (FR)

(73) Assignee: Renault s.a.s., Boulogne Billancourt (FR)

( * ) Notice: Subject to any disclaimer, the term of this patent is extended or adjusted under 35 U.S.C. 154(b) by 248 days.

(21) Appl. No.: 10/521,591

(22) PCT Filed: Jul. 25, 2003

(86) PCT No.: PCT/FR03/02346

§ 371 (c)(1),
(2), (4) Date: Oct. 19, 2005

(87) PCT Pub. No.: WO2004/012319

PCT Pub. Date: Feb. 5, 2004

(65) Prior Publication Data

US 2006/0166063 A1 Jul. 27, 2006

(30) Foreign Application Priority Data

Jul. 25, 2002 (FR) .................................. 02 09453

(51) Int. Cl.
*H01M 8/04* (2006.01)
*H01M 8/10* (2006.01)
(52) U.S. Cl. .............................. 429/30; 429/13; 429/34
(58) Field of Classification Search .................. 429/19, 429/30, 26, 13, 34
See application file for complete search history.

(56) References Cited

U.S. PATENT DOCUMENTS

| 4,001,041 | A | * | 1/1977 | Menard | ........................ 429/17 |
| 5,260,143 | A |   | 11/1993 | Voss et al. | |
| 5,366,818 | A | * | 11/1994 | Wilkinson et al. | ............. 429/13 |
| 6,379,829 | B1 |  | 4/2002 | Kurita | |
| 6,777,121 | B1 | * | 8/2004 | Shimanuki et al. | ............ 429/23 |
| 2002/0001744 | A1 | | 1/2002 | Tsusaka et al. | |

FOREIGN PATENT DOCUMENTS

| DE | 199 18 850 | 11/2000 |
| EP | 1 033 769 | 9/2000 |
| KR | 2001 093 359 | 10/2001 |
| WO | WO 97/41168 | * 11/1997 |

OTHER PUBLICATIONS

KIPO machine translation of KR 2001093359 A.*

* cited by examiner

*Primary Examiner*—Susy Tsang-Foster
*Assistant Examiner*—Maria J Laios
(74) *Attorney, Agent, or Firm*—Oblon, Spivak, McClelland, Maier & Neustadt, P.C.

(57) ABSTRACT

An electric motive power system for a motor vehicle including a fuel cell having at least one set of two electrodes each provided with an electrode input and output, an electrolytic membrane being located between the two electrodes. The electrolytic membrane includes proton conductive charges distributed in the thickness of the membrane in accordance with a concentration gradient, to concentrate the water in liquid form produced by the fuel cell on one of the electrodes, and wherein the water in liquid form thus concentrated is evacuated from the fuel cell through a single electrode output.

15 Claims, 2 Drawing Sheets

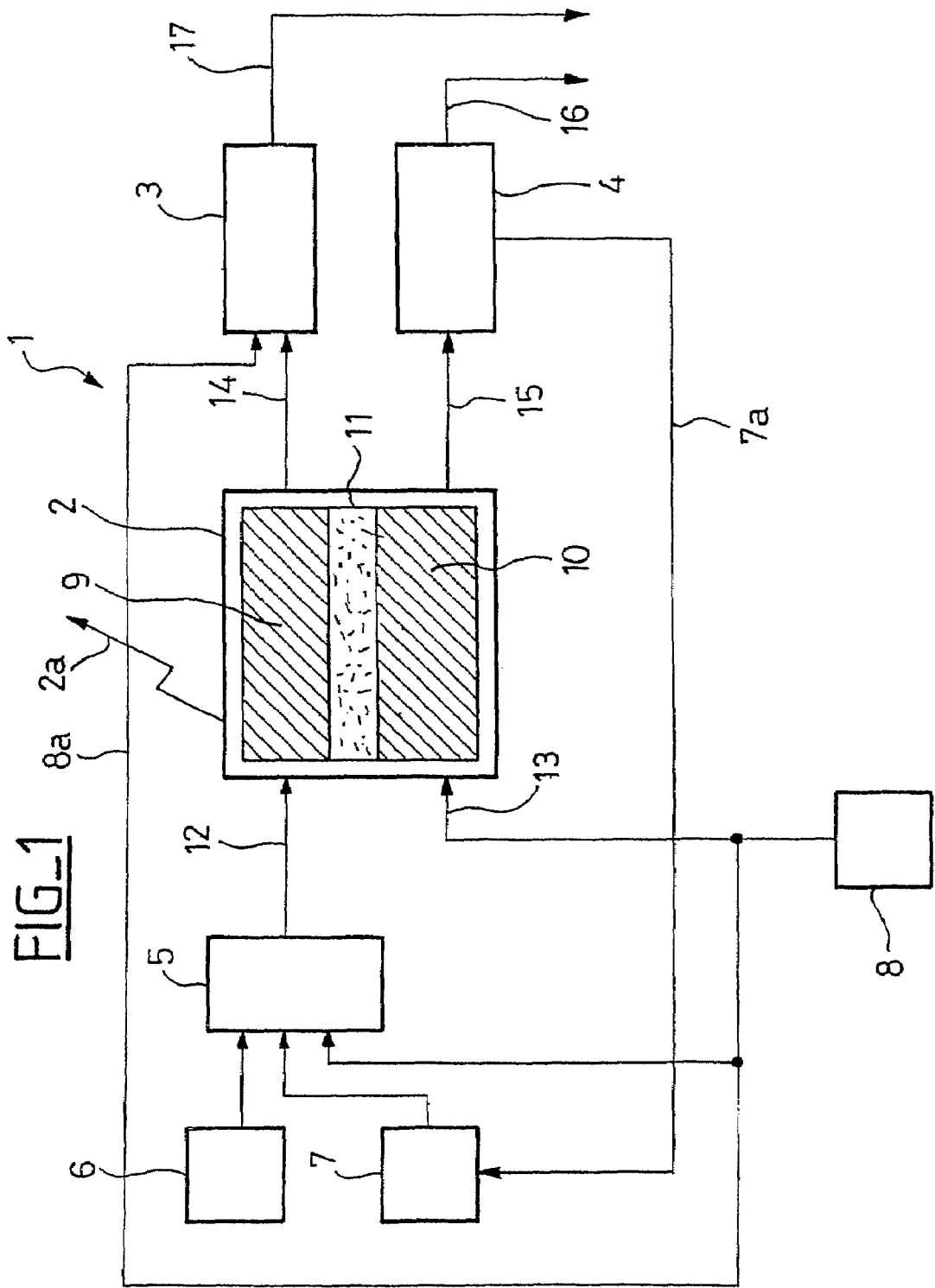

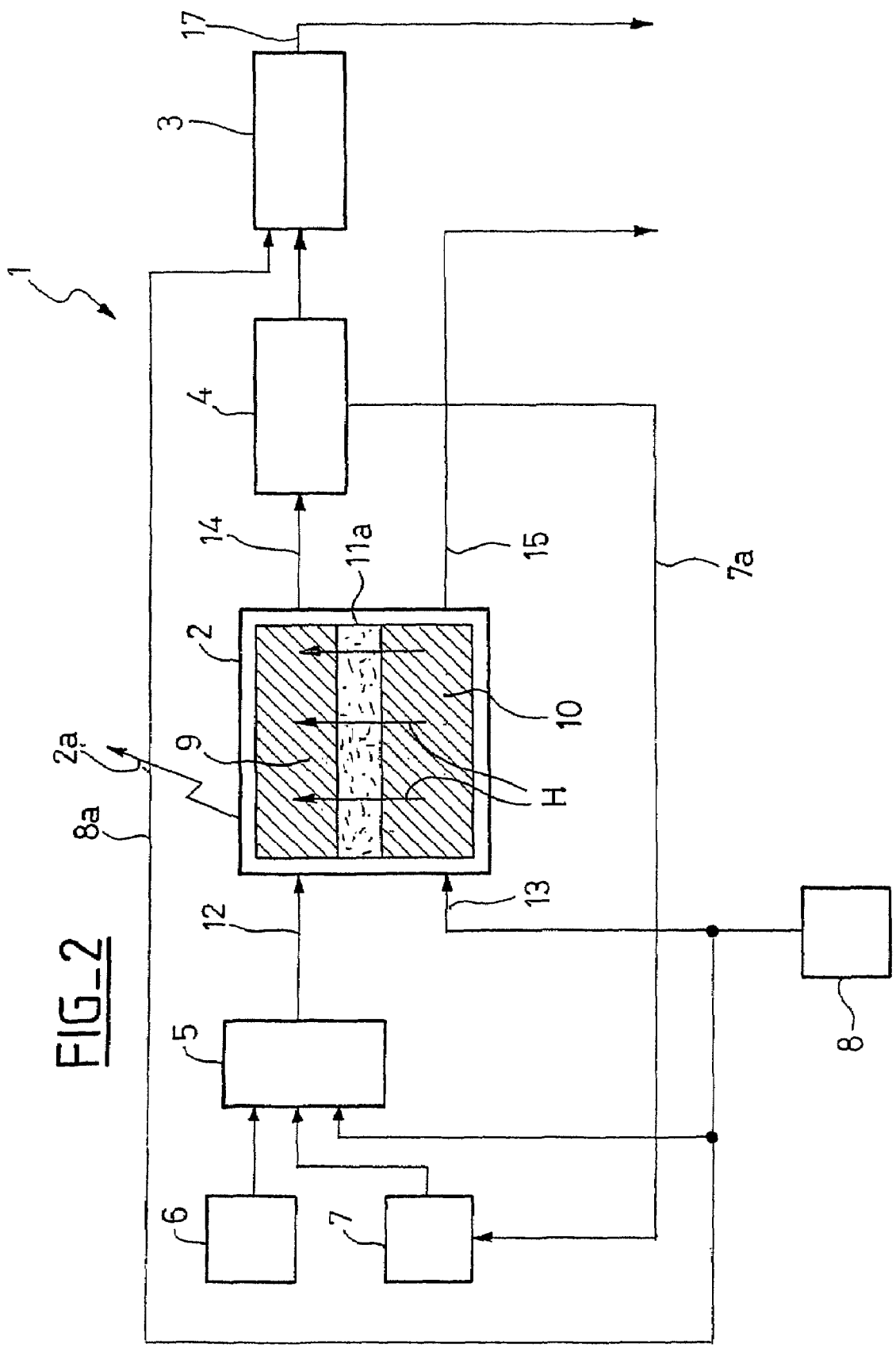

ELECTRIC MOTIVE POWER SYSTEM FOR A MOTOR VEHICLE, AND METHOD FOR USING A FUEL-CELL

TITLE OF THE INVENTION

The present invention relates to an electric propulsion system for a motor vehicle as well as to a method for using a fuel-cell stack.

BACKGROUND OF THE INVENTION

I. Field of the Invention

The fuel-cell stack is looking more and more like the most suitable and most efficient energy converter for converting chemical energy into energy that can be directly used in electrical and thermal form.

II. Description of Related Art

Its operating principle is simple: controlled electrochemical combustion of hydrogen and oxygen, with simultaneous production of electricity, water and heat, via the following chemical reaction: $H2+\frac{1}{2}O2 \rightarrow H2O$. This reaction takes place within a structure composed substantially of two electrodes, the anode and the cathode, separated by an electrolyte: it is the reverse reaction of water electrolysis.

One of the limitations associated with the use of a fuel-cell stack in a motor vehicle is based on water recovery. A system for cooling the gases emerging from the fuel-cell stack is necessary for this purpose. This makes it possible to condense the necessary water, especially to feed a reformer. To achieve a positive water balance in the system, or in other words to ensure that the quantity of water produced by the stack is greater than the quantity of water consumed by the reformer, the gases emerging from the stack must be brought to a temperature referred to as "low temperature" (temperature of the water at the condenser outlet) in order to recover all the necessary water. For reasons related to the cooling circuit (smaller consumption by auxiliary components and smaller volumes), this temperature must be as high as possible.

Korean Patent 2001096359A proposes a fuel-cell stack that comprises a special multi-layer membrane that prevents water from migrating from the cathode to the anode. Special compounds (water-absorbing material, catalyst) are added within the different layers. The sought objective is to try to keep the cathode sufficiently hydrated to avoid problems of degradation of the membrane on the cathode side.

BRIEF SUMMARY OF THE INVENTION

The present invention proposes, for a motor vehicle, an electric propulsion system capable of achieving a high value of the low temperature at the outlet of the gases from the fuel-cell stack.

Another object of the invention is a method for using a fuel-cell stack in an electric propulsion system for a motor vehicle.

The electric propulsion system for a motor vehicle according to the invention comprises a fuel-cell stack provided with at least one assembly of two electrodes, each having an electrode inlet and outlet, and an electrolytic membrane disposed between the two electrodes. The electrolytic membrane contains conductive charges of protons distributed in a concentration gradient within the thickness of the membrane, in such a way that the water in liquid state produced by the fuel-cell stack is concentrated at one of the electrodes. The water in the liquid state concentrated in this way is evacuated from the fuel-cell stack via a single electrode outlet.

The concentration gradient of conductive charges of protons present in the membrane may be continuous. Also conceivable is a multi-layer membrane, in which each layer has a different concentration of conductive charges. The membrane can be of the polymer type. Thus the concentration gradient of conductive charges can be obtained by successively casting solutions of polymers having different equivalent masses, or in other words having different concentrations of conductive charges. This type of membrane can be produced preferably with any protonic conductive polymer capable of being dissolved in solution and possessing good film-forming properties that allow very thin membrane layers (on the order of approximately ten microns) to be obtained.

The low temperature is a function of system pressure and of the quantity of dry gases that carry the water away. It obeys the equation:

$$n_v = p(T) * n_s / (P - p(T))$$

with $n_v$: flowrate of water in gaseous form directed to the exhaust $n_s$: flowrate of gases that carry away the water in vapor form P: total system pressure p (T): water partial pressure at the temperature of the condenser outlet T: water temperature at the condenser outlet.

By rearranging this expression in the following form:

$p(T) = P/(1 + n_s/n_v)$, it is evident that the value of p(T) and thus also the value of T can be increased by decreasing the quantity of dry gases that carry the vapor away.

The invention takes advantage of this fact. By concentrating the water at a single electrode, the flowrate of dry gases that carry the water away is decreased, thus raising the value of the low temperature T.

The water in liquid state produced by the fuel-cell stack can be concentrated either at the anode or at the cathode.

To concentrate, at the cathode, the water in liquid state produced by the fuel-cell stack, it is sufficient to place the membrane in such a way that the maximum concentration of conductive charges of the membrane is situated on the same side as the cathode or, in the case of a multi-layer membrane, such that the layer with the highest concentration of conductive charges is situated on the same side as the cathode. In this way the process of back-diffusion toward the anode of part of the water produced at the cathode is limited.

Nevertheless, the water in liquid state produced by the fuel-cell stack is preferably concentrated at the anode, because the low temperature obtained is generally higher than when the water is concentrated at the cathode. In addition, the mode of operation with concentration of the water at the anode is easier to achieve in practice. In this case, the membrane is placed between the anode and the cathode in such a way that the maximum concentration of conductive charges of the membrane is situated on the same side as the anode or, in the case of a multi-layer membrane, such that the layer with the highest concentration of conductive charges is situated on the same side as the anode. In this way the water is strongly attracted toward the anode, thus causing a back-diffusion flow toward the anode of water produced at the cathode and ensuring that almost all of the water produced at the cathode is recovered at the anode.

Preferably the aforesaid single electrode outlet of the fuel-cell stack is connected to a single condenser. In this way the invention makes it possible to use only a single condenser instead of two and therefore to save on condenser volume.

The condenser can feed a water reservoir. This water reservoir is connected to a reformer. Thus the condensed water emerging from the condenser can feed a reformer capable of supplying hydrogen from a fuel to the fuel-cell stack.

The electric propulsion system can additionally contain a burner connected to the anode to recover the energy of the gases emerging from the anode. In the case that the water in liquid state produced by the fuel-cell stack is concentrated at the anode, the burner can be positioned downstream from the condenser.

Another object of the invention is a method for using a fuel-cell stack in an electric propulsion system for a motor vehicle. The method comprises the following successive main stages:

concentration of the water in liquid state produced by the fuel-cell stack at one of the electrodes by means of an electrolytic membrane containing conductive charges of protons distributed in a concentration gradient within the thickness of the membrane, vaporization within this electrode of the water in liquid state concentrated in this way, condensation of the vaporized water in a condenser connected to the outlet of the said electrode, use of the water condensed in this way to feed a reformer capable of generating hydrogen to feed the fuel-cell stack.

BRIEF DESCRIPTION OF THE DRAWINGS

Other advantages and characteristics of the invention will become apparent from examination of the detailed description of two practical examples, in no way limitative, of the electric propulsion system of the invention as illustrated by FIGS. 1 and 2, wherein:

FIG. 1 illustrates a subassembly of an electric propulsion system for a motor vehicle according to a first embodiment of the invention, FIG. 2 illustrates a subassembly of an electric propulsion system for a motor vehicle according to a second embodiment of the invention.

DETAILED DESCRIPTION OF THE INVENTION

FIG. 1 shows a subassembly 1 of an electric propulsion system for a motor vehicle. Subassembly 1 comprises a fuel-cell stack 2 connected to a burner 3, to a condenser 4 and to a reformer 5.

Fuel-cell stack 2 is equipped with an anode 9 and a cathode 10, separated by an electrolytic membrane 11. The electric current produced by stack 2 is passed via connection 2a to processing means and an electric propulsion motor, neither of which is illustrated. Fuel-cell stack 2 is fed at anode inlet 12 with hydrogen generated by reformer 5. Reformer 5 is fed with hydrocarbon stored in a fuel reservoir 6, with water discharged from water reservoir 7 and with air discharged from air-supply device 8. By virtue of air-supply device 8, the fuel-cell stack is also fed with air at cathode inlet 13.

At anode 9, the hydrogen emerging from reformer 5 is transformed to H⁺ ions while liberating electrons according to the following reaction:

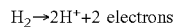

$$H_2 \rightarrow 2H^+ + 2 \text{ electrons}$$

At cathode 10, the oxygen of the air passed through air-supply device 8 will capture electrons to form ionized oxygen according to the following reaction:

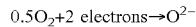

$$0.5 O_2 + 2 \text{ electrons} \rightarrow O^{2-}$$

The protons H⁺ are transported through membrane 11 toward cathode 10 where they will react with the oxygen of the air. The reaction is as follows:

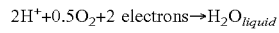

$$2H^+ + 0.5 O_2 + 2 \text{ electrons} \rightarrow H_2O_{liquid}$$

In this first embodiment of the invention, membrane 11 prevents the liquid water produced at cathode 10 from back-diffusing toward anode 9. This can be achieved by means of a multi-layer membrane containing conductive charges of protons distributed in a concentration gradient within the thickness of membrane 11, the layer with the highest concentration of conductive charges in membrane 11 being situated on the same side as cathode 10, so that the water cannot back-diffuse toward anode 9.

The liquid water is therefore concentrated at cathode 10. The liquid water is then vaporized under the effect of the heat present in fuel-cell stack 2, after which this vapor is carried away by the cathodic gases at cathode outlet 15.

Thus, by concentrating the water at cathode 10, only the cathodic gases emerge in humid condition. The flowrate of dry gas that carries away the vapor is therefore decreased and, as seen hereinabove, the low temperature T is raised as a result. For example, for a fuel-cell stack operating at 80° C. and 3 bar absolute, the low temperature is close to 61° C. for the case of traditional operation with recovery of water at the anode and at the cathode. With concentration of the water at the cathode, this temperature is close to 71° C.

The gases emerging from cathode 10 at cathode outlet 15 are passed toward condenser 4. Condenser 4 is used as a cooling source capable of condensing the water vapor contained in the cathodic gases. The water condensed in this way is then passed via conduit 7a toward water reservoir 7, intended to feed reformer 5 with water. The non-condensed gases are evacuated from the circuit via condenser outlet 16. Since a condenser is not needed at anode outlet 14, the invention makes it possible to use only a single condenser 4 instead of two, and therefore to save one condenser volume.

The gases emerging from anode 9 at anode outlet 14 comprise neutral gases discharged from reformer 5 as well as hydrogen that did not react in fuel-cell stack 2 and is also discharged from reformer 5. These gases do not contain any water vapor, since this is concentrated at cathode 10. They are passed toward burner 3, also supplied via conduit 8a with air from air-supply device 8. The gases discharged from burner 3 are evacuated from the circuit at burner outlet 17.

FIG. 2, in which identical elements are denoted by the same reference numerals, shows a subassembly 1 of an electric propulsion system for a motor vehicle according to a second embodiment of the invention.

In this embodiment, the liquid water produced by fuel-cell stack 2 is concentrated at anode 9, in the direction indicated by arrows H. This concentration at anode 9 is achieved by means of multi-layer membrane 11a. Membrane 11a contains conductive charges of protons distributed in a concentration gradient within the thickness of membrane 11a, the layer having the highest concentration of conductive charges being situated on the same side as anode 9. In this way the water is strongly attracted toward anode 9, thus causing a back-diffusion flow toward anode 9, in the direction indicated by arrows H, of water produced at cathode 10, and ensuring that almost all of the water produced at cathode 10 is recovered at anode 9.

The liquid water concentrated at anode 9 is then vaporized under the effect of the heat present in fuel-cell stack 2, after which this vapor is carried away by the anodic gases at the anode outlet 14.

Thus, by concentrating the water at anode 9, only the anodic gases emerge in humid condition. In the same way as in the first embodiment, the flowrate of dry gas that carries away the vapor is therefore decreased and, as seen hereinabove, the low temperature T is raised as a result. For example, for a fuel-cell stack operating at 80° C. and 3 bar absolute, the low temperature is close to 61° C. for the case of traditional operation with recovery of water at the anode and at the cathode. With concentration of the water at the anode, this temperature is close to 81° C.

The gases emerging from anode 9 at anode outlet 14 are passed toward single condenser 4. Condenser 4 is used as a cooling source capable of condensing the water vapor contained in the anodic gases. The water condensed in this way is then passed via conduit 7a toward water reservoir 7, intended to feed reformer 5 with water. The non-condensed gases are passed toward burner 3 which, via conduit 8a, is also supplied with air from air-supply device 8. The gases discharged from burner 3 are evacuated from the circuit at burner outlet 17.

The gases emerging from cathode 10 are the oxygen and nitrogen discharged from air-supply device 8. These gases do not contain any water vapor, since this water is concentrated at anode 9. They are directly evacuated from the circuit at cathode outlet 15.

Among the advantages of the invention that cannot be achieved by using the teaching of Korean Patent 2001096359A, the merits of induced total water transfer according to the present invention are explained from a system viewpoint. In this case also, it is the quantity of conductive sulfonated charges that is modified in the present invention to create the gradient and to direct all the water either to the anode or to the cathode, depending on how the membrane is positioned. In one embodiment of the present invention, the water is concentrated at the anode, and this achieves a better heat balance as a special effect.

The invention claimed is:

1. An electric propulsion system for a motor vehicle, comprising:
    a fuel-cell stack provided with at least one assembly of two electrodes, each electrode having an electrode inlet and outlet, and an electrolytic membrane disposed between the two electrodes,
    wherein the electrolytic membrane contains conductive charges of protons distributed in a concentration gradient within a thickness of the membrane, such that water in a liquid state produced by the fuel-cell stack is concentrated at one of the electrodes, and
    wherein the concentrated water in the liquid state is evacuated from the fuel-cell stack via a single electrode outlet.

2. A system according to claim 1, wherein the electrolytic membrane is a multi-layer membrane.

3. A system according to claim 1, wherein a maximum concentration of conductive charges of the membrane is situated on a same side as an anode of the two electrodes, such that the water in the liquid state produced by the fuel-cell stack is concentrated at the anode.

4. A system according to claim 1, wherein a maximum concentration of conductive charges of the membrane is situated on a same side as a cathode of the two electrodes, such that the water in the liquid state produced by the fuel-cell stack is concentrated at the cathode.

5. A system according to claim 1, wherein the single electrode outlet of the fuel-cell stack is connected to a single condenser.

6. A system according to claim 5, wherein condensed water discharged from the condenser feeds a reformer configured to supply hydrogen from a fuel to the fuel-cell stack.

7. A system according to claim 5, further comprising a burner connected to an anode of the two electrodes to recover energy of gases discharged from the anode.

8. A system according to claim 3, wherein the single electrode outlet of the fuel-cell stack is connected to a single condenser.

9. A system according to claim 8, further comprising a burner connected to an anode of the two electrodes to recover energy of gases discharged from the anode.

10. A system according to claim 7, wherein the burner is disposed downstream from the condenser.

11. A system according to claim 9, wherein the burner is disposed downstream from the condenser.

12. A vehicle provided with a system according to claim 1.

13. A method for using a fuel-cell stack in an electric propulsion system for a motor vehicle, comprising:
    concentrating water in a liquid state produced by the fuel-cell stack at one of two electrodes by an electrolytic membrane containing conductive charges of protons distributed in a concentration gradient within a thickness of the membrane;
    vaporizing within the one electrode the concentrated water in the liquid state;
    condensing the vaporized water in a condenser connected to an outlet of the one electrode; and
    using the condensed water to feed a reformer configured to generate hydrogen to feed the fuel-cell stack.

14. An electric propulsion system for a motor vehicle, comprising:
    a fuel-cell stack including a first electrode, a second electrode, and an electrolytic membrane disposed between the first electrode and the second electrode; and
    a condenser connected to a first electrode by a single electrode outlet, wherein
    the electrolytic membrane contains conductive charges of protons distributed in a concentration gradient such that a maximum concentration of the conductive charges of protons within a thickness of the membrane is located closest to the first electrode to concentrate water in a liquid state produced by the fuel-cell stack at the first electrode, and
    the concentrated water in the liquid state is evacuated from the fuel-cell stack via the single electrode outlet.

15. A system according to claim 14, wherein
    the electrolytic membrane is a multi-layer membrane,
    each layer of the multi-layer membrane has a different concentration of conductive charges of protons, and
    a layer of the multi-layer membrane with a highest concentration of conductive charges of protons is located closest to the first electrode.

* * * * *